United States Patent
Li et al.

(10) Patent No.: US 10,769,267 B1
(45) Date of Patent: Sep. 8, 2020

(54) SYSTEMS AND METHODS FOR CONTROLLING ACCESS TO CREDENTIALS

(71) Applicant: Symantec Corporation, Mountain View, CA (US)

(72) Inventors: Feng Li, Ontario (CA); Adam Glick, Culver City, CA (US); Brian Schlatter, Playa Vista, CA (US); Akshata Krishnamoorthy Rao, Mountain View, CA (US)

(73) Assignee: CA, Inc., San Jose, CA (US)

( * ) Notice: Subject to any disclaimer, the term of this patent is extended or adjusted under 35 U.S.C. 154(b) by 466 days.

(21) Appl. No.: 15/265,314

(22) Filed: Sep. 14, 2016

(51) Int. Cl.
| | | |
|---|---|---|
| *G06F 21/44* | (2013.01) | |
| *G06F 21/31* | (2013.01) | |
| *G06F 21/55* | (2013.01) | |
| *G06F 21/57* | (2013.01) | |
| *G06F 8/65* | (2018.01) | |

(52) U.S. Cl.
CPC ............... *G06F 21/44* (2013.01); *G06F 8/65* (2013.01); *G06F 21/316* (2013.01); *G06F 21/554* (2013.01); *G06F 21/577* (2013.01); *G06F 2221/034* (2013.01)

(58) Field of Classification Search
CPC .......... G06F 21/44; G06F 8/65; G06F 21/316; G06F 21/554; G06F 21/577; G06F 2221/034
See application file for complete search history.

(56) References Cited

U.S. PATENT DOCUMENTS

| | | | | |
|---|---|---|---|---|
| 6,006,328 A | * | 12/1999 | Drake ..................... | G06F 21/14 713/188 |
| 7,870,376 B2 | * | 1/2011 | Gierens ................... | G06F 21/31 713/165 |
| 8,321,940 B1 | * | 11/2012 | Pereira .................... | G06F 21/00 726/23 |
| 8,479,010 B2 | * | 7/2013 | Cooley ................... | G06F 21/45 713/183 |
| 8,549,641 B2 | * | 10/2013 | Jakobsson ............. | G06F 21/552 726/23 |

(Continued)

OTHER PUBLICATIONS

Dagdee et al, "Credential based hybrid access control methodology for shared Electronic Health Records," 2009 International Conference on Information Management and Engineering, pp. 624-628 (Year: 2009).*

(Continued)

*Primary Examiner* — Luu T Pham
*Assistant Examiner* — James J Wilcox
(74) *Attorney, Agent, or Firm* — FisherBroyles, LLP

(57) ABSTRACT

A computer-implemented method for controlling access to credentials may include (i) maintaining, by a computing device, a set of applications for which attempting to access digital credentials comprises anomalous behavior, (ii) monitoring, by the computing device, each application within the set of applications for attempts to access digital credentials, (iii) automatically detecting, while monitoring for attempts to access digital credentials, an attempt of an application in the set of applications to access a digital credential, and (iv) performing, in response to detecting the attempt to access the digital credential, a security action to secure the digital credential. Various other methods, systems, and computer-readable media are also disclosed.

17 Claims, 7 Drawing Sheets

(56) References Cited

U.S. PATENT DOCUMENTS

| | | | | |
|---|---|---|---|---|
| 8,677,466 B1* | 3/2014 | Chuang | H04L 9/321 | 709/229 |
| 8,752,180 B2* | 6/2014 | Barile | G06F 21/577 | 713/152 |
| 8,850,406 B1* | 9/2014 | Morrill | G06F 8/61 | 717/124 |
| 8,868,915 B2* | 10/2014 | Counterman | G06F 21/335 | 713/176 |
| 8,955,068 B1* | 2/2015 | Venkataramani | H04L 63/08 | 707/737 |
| 9,215,074 B2* | 12/2015 | Wyatt | G06F 8/70 | |
| 9,306,960 B1* | 4/2016 | Aziz | H04L 63/101 | |
| 9,436,820 B1* | 9/2016 | Gleichauf | G06F 21/50 | |
| 9,910,997 B1* | 3/2018 | Brail | G06F 21/62 | |
| 10,044,694 B2* | 8/2018 | Miyoshi | H04L 63/08 | |
| 2003/0177250 A1* | 9/2003 | Oliver | G06F 21/33 | 709/229 |
| 2003/0233581 A1* | 12/2003 | Reshef | G06F 21/554 | 726/25 |
| 2004/0019807 A1* | 1/2004 | Freund | H04L 63/145 | 726/1 |
| 2006/0171537 A1* | 8/2006 | Enright | H04L 63/083 | 380/270 |
| 2008/0263352 A1* | 10/2008 | Krahn | G06F 21/42 | 713/151 |
| 2010/0211716 A1* | 8/2010 | Chen | H04W 12/0608 | 710/316 |
| 2010/0263049 A1* | 10/2010 | Cross | G06F 21/577 | 726/23 |
| 2011/0010756 A1* | 1/2011 | Choi | G06F 21/53 | 726/2 |
| 2011/0191132 A1* | 8/2011 | Westcott | G06Q 10/06 | 705/7.11 |
| 2011/0314145 A1* | 12/2011 | Raleigh | H04L 47/19 | 709/224 |
| 2012/0234923 A1* | 9/2012 | Tamma | G06F 21/34 | 235/492 |
| 2013/0081101 A1* | 3/2013 | Baer | H04L 63/20 | 726/1 |
| 2014/0068717 A1* | 3/2014 | Mayes | G06F 21/44 | 726/3 |
| 2014/0337937 A1* | 11/2014 | Truskovsky | G06F 21/45 | 726/5 |
| 2015/0134951 A1* | 5/2015 | Bohrer | H04L 63/0823 | 713/156 |
| 2015/0215313 A1* | 7/2015 | Krahn | H04L 63/0428 | 713/171 |
| 2015/0310211 A1* | 10/2015 | Mei | G06N 5/048 | 726/23 |
| 2015/0341353 A1* | 11/2015 | Zhou | H04L 9/3268 | 713/175 |
| 2016/0112451 A1* | 4/2016 | Jevans | G06F 21/51 | 726/25 |
| 2016/0140334 A1* | 5/2016 | Forehand | G06F 21/44 | 726/19 |
| 2016/0149889 A1* | 5/2016 | Ortiz-Munoz | H04L 63/123 | 726/7 |
| 2016/0203316 A1* | 7/2016 | Mace | G06F 21/316 | 726/23 |
| 2017/0061432 A1* | 3/2017 | Ekambaram | G06Q 20/405 | |
| 2017/0104775 A1* | 4/2017 | Vasseur | H04L 41/145 | |
| 2017/0126709 A1* | 5/2017 | Baradaran | H04L 63/1416 | |
| 2017/0208093 A1* | 7/2017 | Williams | H04L 63/20 | |
| 2017/0346843 A1* | 11/2017 | Zhang | G06F 21/44 | |

OTHER PUBLICATIONS

Symantec Advanced Threat Protection, Oct. 2015: https://www.symantec.com/products/threat-protection/advanced-threat-protection.

FireEye, Mar. 2, 2016: http://finance.yahoo.com/news/fireeye-enhances-protection-endpoints-exploits-130000155.html.

Prelert, Feb. 29, 2016, http://info.prelert.com/blog/detecting-malware-free-intrusions-and-advanced-cyber-threats-with-anomaly-detection-and-behavioral-md5-of-endpoint-processes.

* cited by examiner

SYSTEMS AND METHODS FOR CONTROLLING ACCESS TO CREDENTIALS

BACKGROUND

Security software may monitor the activity of applications and attempt to block intruders from exploiting applications on a computing system. When an intruder is successful, some security software may focus on preventing further unauthorized access to credential information. For example, an attacker who infiltrates a system may also attempt to increase unauthorized access by stealing the login credentials of a legitimate user of the system. In another example, an attacker may use a compromised software application to obtain a user's credentials and increase the attacker's privileges. Traditional security solutions may attempt to block all application access to credentials in order to prevent such breaches of security.

Unfortunately, in some cases, applications may have legitimate reasons to access credentials. For example, a client management tool may need to read credential data in order to perform certain functions. In these situations, traditional security systems may block legitimate attempts to access the credential data. Furthermore, traditional security systems may not be able to identify whether an application is vulnerable to infiltrations attacks. Therefore, more effective and efficient technologies for identifying threats to digital credentials are needed to accurately detect potential breaches.

SUMMARY

As will be described in greater detail below, the instant disclosure describes various systems and methods for controlling access to credentials. In one example, a computer-implemented method for controlling access to credentials may include (i) maintaining, by a computing device, a set of applications for which attempting to access digital credentials comprises anomalous behavior, (ii) monitoring, by the computing device, each application within the set of applications for attempts to access digital credentials, (iii) automatically detecting, while monitoring for attempts to access digital credentials, an attempt of an application in the set of applications to access a digital credential, and (iv) performing, in response to detecting the attempt to access the digital credential, a security action to secure the digital credential.

In some embodiments, maintaining the set of applications may include, for each application installed on the computing device, determining that the application is installed on a minimum number of other computing devices, determining that attempting to access digital credentials comprises anomalous behavior for the application, and verifying a digital certificate of the application. In these embodiments, determining that attempting to access digital credentials comprises anomalous behavior for the application may include determining that the application does not require digital credentials to function and/or determining that the application does not display a historical behavior pattern of attempting to access digital credentials.

In some examples, the attempt to access the digital credential may include an attempt to read from a digital memory of a credential program. Additionally or alternatively, the attempt to access the digital credential may include an attempt to access a registry path leading to credential data.

In one embodiment, performing the security action may include triggering an alert on the computing device, notifying an administrator about the attempt to access the digital credential, and/or blocking the attempt to access the digital credential. Additionally or alternatively, performing the security action may include sending an application update suggestion to a user of the computing device and/or automatically updating the application to patch a vulnerability.

In one example, the computer-implemented method may further include modifying a record of historical behavior for the application based on the attempt to access the digital credential.

In one embodiment, a system for implementing the above-described method may include (i) a maintenance module, stored in memory, that maintains, by a computing device, a set of applications for which attempting to access digital credentials comprises anomalous behavior, (ii) a monitoring module, stored in memory, that monitors, by the computing device, each application within the set of applications for attempts to access digital credentials, (iii) a detection module, stored in memory, that automatically detects, while monitoring for attempts to access digital credentials, an attempt of an application in the set of applications to access a digital credential, and (iv) a performance module, stored in memory, that performs, in response to detecting the attempt to access the digital credential, a security action to secure the digital credential. In addition, the system may include at least one processor that executes the maintenance module, the monitoring module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) maintain a set of applications for which attempting to access digital credentials comprises anomalous behavior, (ii) monitor each application within the set of applications for attempts to access digital credentials, (iii) automatically detect, while monitoring for attempts to access digital credentials, an attempt of an application in the set of applications to access a digital credential, and (iv) perform, in response to detecting the attempt to access the digital credential, a security action to secure the digital credential.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
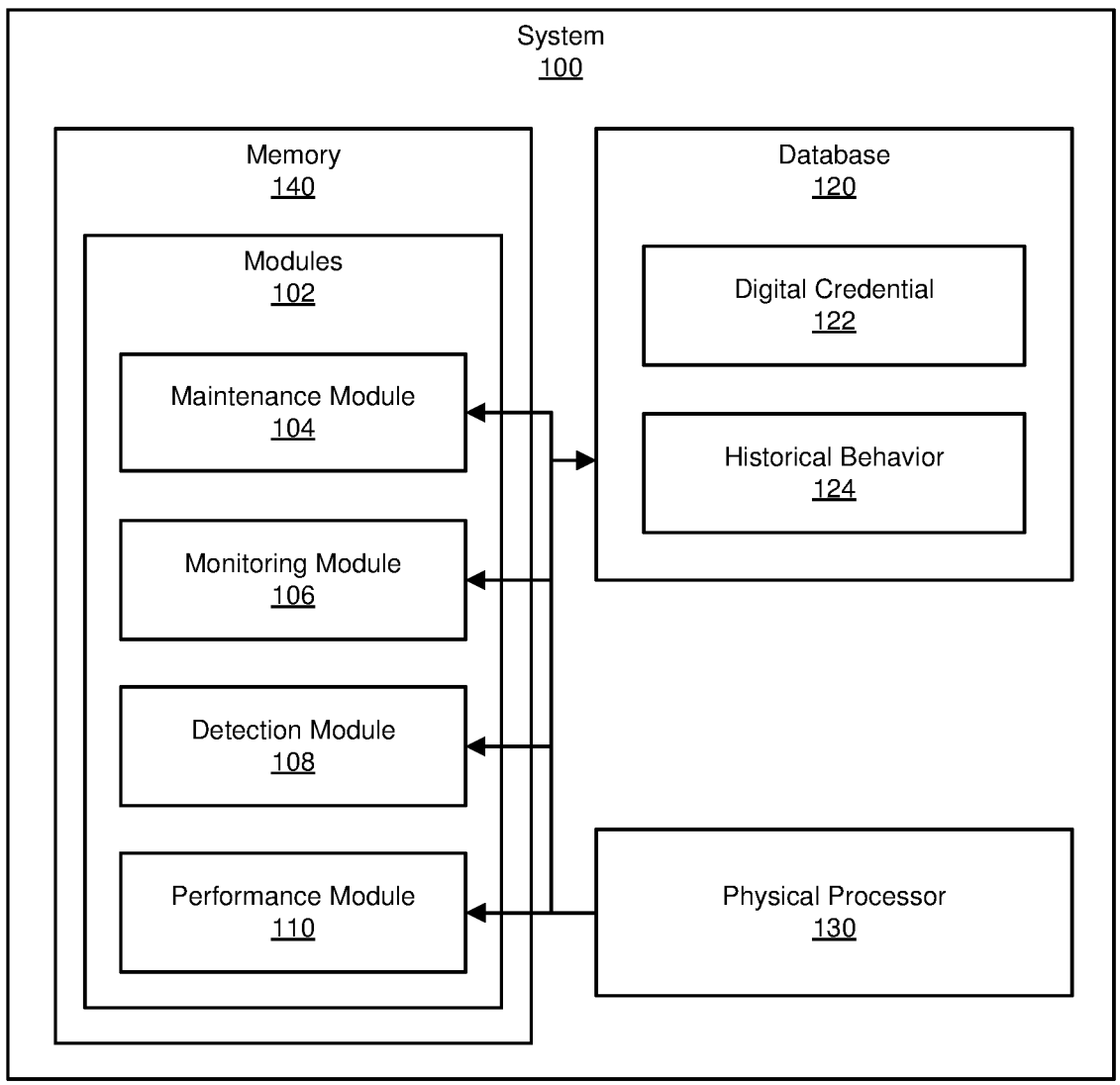
FIG. 1 is a block diagram of an example system for controlling access to credentials.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for controlling access to credentials. As will be explained in greater detail below, by monitoring a specific set of software applications that may fall under strict guidelines, the systems and methods described herein may more accurately detect anomalous attempts to access digital credentials than traditional methods. For example, by monitoring applications that are widely used, do not usually access digital credentials, and have a valid digital certificate, the disclosed systems and methods may avoid falsely classifying legitimate credential access as attacks while allowing stricter observation of commonly exploited applications. The disclosed systems and methods may then prevent an attempted unauthorized access and strengthen security against potentially compromised applications.

In addition, the systems and methods described herein may improve the functioning of a computing device by determining what applications to monitor based on whether attempting to access digital credentials comprises anomalous behavior and, in response, increasing the security of the computing device against potential compromise of credentials. These systems and methods may also improve the field of threat detection and/or enterprise security by preventing compromise of additional credentials or computing devices in the case of compromise to a single application or device.

Figure 2:
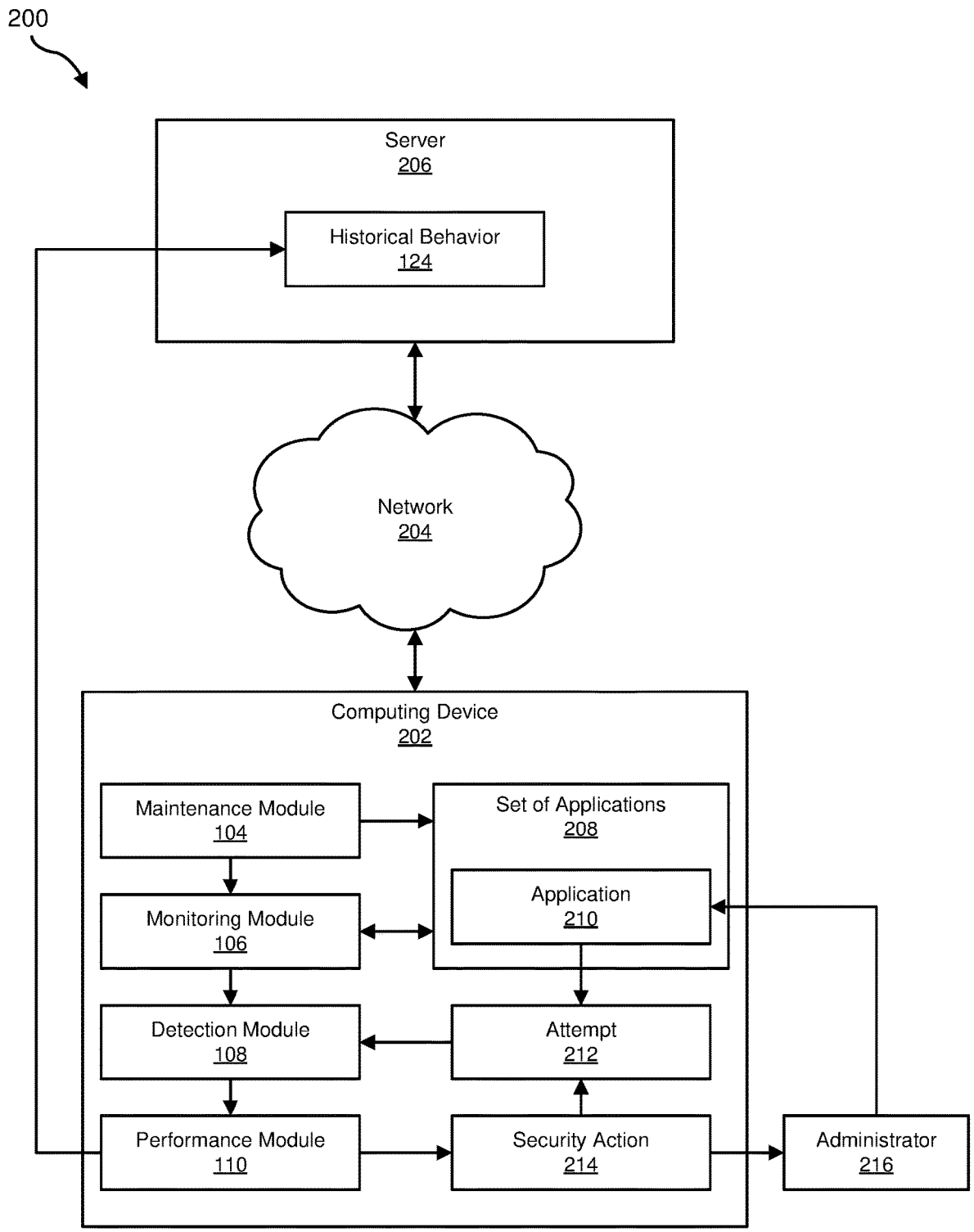
FIG. 2 is a block diagram of an additional example system for controlling access to credentials.

The following will provide, with reference to FIGS. 1 and 2, detailed descriptions of example systems for controlling access to credentials. Detailed descriptions of corresponding computer-implemented methods will also be provided in connection with FIG. 3. In addition, detailed descriptions of an example determination of an example set of applications for which attempting to access digital credentials comprises anomalous behavior will be provided in connection with FIG. 4. Furthermore, detailed descriptions of an example attempt to access an example digital credential will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for controlling access to credentials. As illustrated in this figure, example system 100 may include one or more modules 102 for performing one or more tasks. As will be explained in greater detail below, modules 102 may include a maintenance module 104 that maintains, by a computing device, a set of applications for which attempting to access digital credentials comprises anomalous behavior. The term "application," as used herein, generally refers to a software program designed to perform specific functions or tasks for a user. Examples of applications include, without limitation, productivity software, enterprise software, web applications, content access software, simulation software, mobile applications, variations or combinations of one or more of the same, and/or any other suitable software application.

The term "digital credential," as used herein, generally refers to a virtual form of certification that indicates an identity, a validity, and/or a qualification associated with an entity. Examples of digital credentials include, without limitation, a password, a certificate, a level of access, a digital key, personal information, a digital signature, a hash of one of the above, variations or combinations of one or more of the same, and/or any other suitable form of digital certification.

Example system 100 may additionally include a monitoring module 106 that monitors, by the computing device, each application within the set of applications for attempts to access digital credentials. Example system 100 may also include a detection module 108 that automatically detects, while monitoring for attempts to access digital credentials, an attempt of an application in the set of applications to access a digital credential. Example system 100 may further include a performance module 110 that performs, in response to detecting the attempt to access the digital credential, a security action to secure the digital credential. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controlling access to credentials. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may additionally include one or more databases, such as database 120. In one example, database 120 may be configured to store a digital credential 122, which may include a user credential or a digital certificate, and/or a historical behavior 124, which may include a record of functions or actions associated with an application. Database 120 may represent portions of a single database or computing device or a plurality of databases or computing devices. For example, database 120 may represent a portion of computing device 202 and/or server 206 in FIG. 2. Alternatively, database 120 in FIG. 1 may represent one or more physically separate devices capable of being accessed by a computing device, such as computing device 202 and/or server 206 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. Similarly, both server 206 and computing device 202 may be merged into a single machine or computing system such that the functionality of each of modules 102 is provided within a single device.

As will be described in greater detail below, one or more of modules 102 from FIG. 1 may, when executed by at least one processor of computing device 202 and/or server 206, enable computing device 202 and/or server 206 to prevent unauthorized access to digital credentials. For example, and as will be described in greater detail below, maintenance module 104 may maintain a set of applications 208 for which attempting to access digital credentials comprises anomalous behavior. Monitoring module 106 may monitor each application within set of applications 208 for attempts to access digital credentials. Detection module 108 may automatically detect, while monitoring for attempts to access digital credentials, an attempt 212 of an application 210 in set of applications 208 to access a digital credential, such as digital credential 122 in FIG. 1. Performance module 110 may perform, in response to detecting attempt 212 to access the digital credential, a security action 214 to secure the digital credential.

In the example of FIG. 2, and as will be explained in greater detail below, computing device 202 may first maintain set of applications 208 based on identifying applications for which attempting to access digital credentials comprises anomalous behavior. Computing device 202 may then monitor the applications in set of applications 208 and detect attempt 212 by application 210 to access a credential. Next, computing device 202 may perform security action 214 to prevent attempt 212 from accessing the credential. Furthermore, computing device 202 may alert an administrator 216 of attempt 212 and prompt administrator 216 to update application 210. Finally, computing device 202 may modify, via network 204, historical behavior 124 for application 210 stored on server 206 based on attempt 212.

Computing device 202 generally represents any type or form of computing device capable of reading computer-executable instructions. For example, computing device 202 may represent an endpoint device running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of storing, transmitting, and/or managing records of historical behavior of applications. For example, server 206 may represent a consolidation server that consolidates historical behavior of applications from multiple client devices and services historical behavior lookups. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
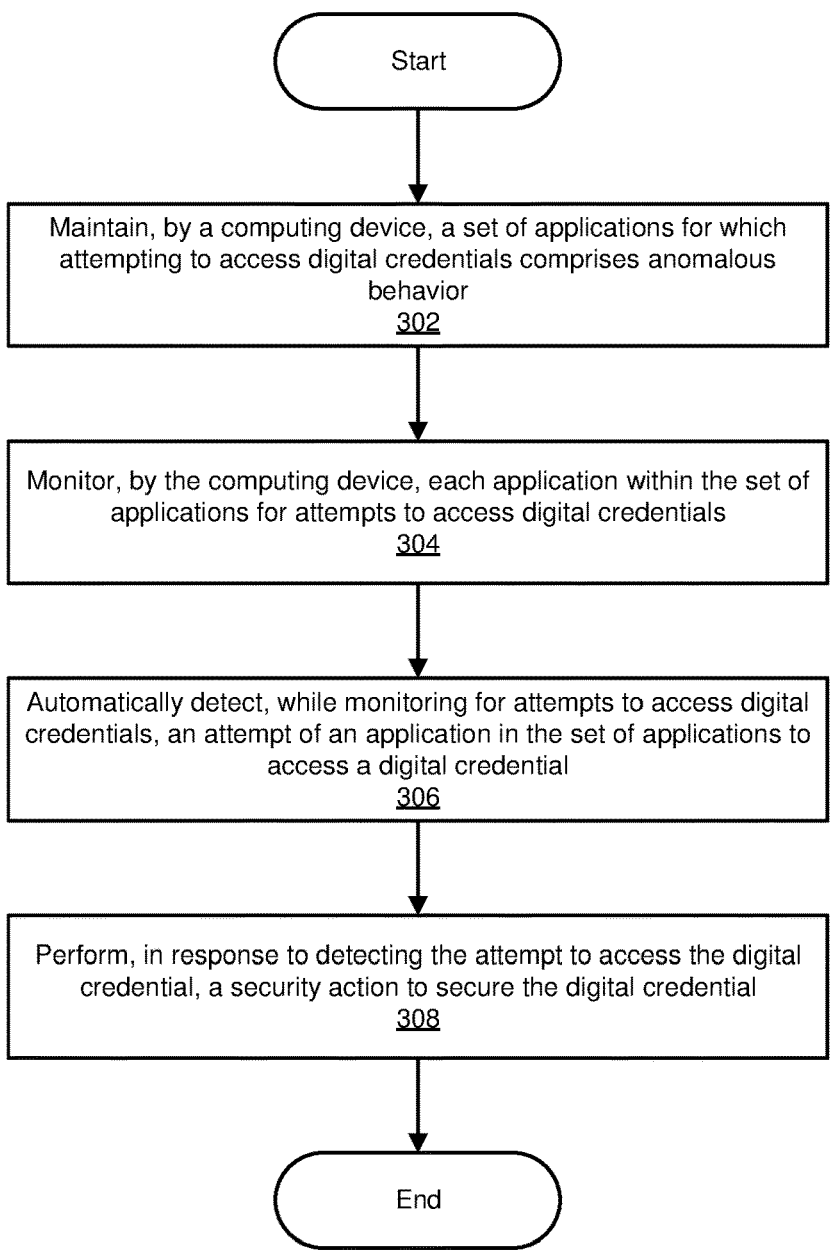
FIG. 3 is a flow diagram of an example method for controlling access to credentials.

FIG. 3 is a flow diagram of an example computer-implemented method 300 for controlling access to credentials. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may maintain, by a computing device, a set of applications for which attempting to access digital credentials comprises anomalous behavior. For example, maintenance module 104 may, as part of computing device 202 in FIG. 2, maintain set of applications 208 for which attempting to access digital credentials comprises anomalous behavior.

Maintenance module 104 may maintain set of applications 208 in a variety of ways. In some examples, maintenance module 104 may maintain set of applications 208 by, for each application installed on computing device 202, determining that the application is installed on a minimum number of other computing devices, determining that attempting to access digital credentials comprises anomalous behavior for the application, and verifying a digital certificate of the application. For example, maintenance module 104 may verify the digital certificate of the application by verifying that an application file matches the digital certificate and/or ensuring the digital certificate is signed by a trusted certificate authority. The term "digital certificate," as used herein, generally refers to a certificate that is digitally signed to validate a file. As used herein, the term "certificate authority" generally refers to an entity that issues and/or signs a digital certificate, such as by using a digital key.

In these examples, by determining that the application is installed on a minimum number of other computing devices, maintenance module 104 may ensure the application is widely used and potentially at risk of compromised security. Furthermore, by verifying the digital certificate of the application, maintenance module 104 may detect illegitimate or spoofed applications. For example, through Secure Sockets Layer (SSL) or Transport Layer Security (TLS) validation, maintenance module 104 may determine that an application is not legitimate and, therefore, should be removed from computing device 202 and/or excluded from a legitimate list of applications for which attempting to access digital credentials comprises anomalous behavior.

In the above examples, maintenance module 104 may determine that attempting to access digital credentials comprises anomalous behavior for the application by determining that the application does not require digital credentials to function and/or determining that the application does not display a historical behavior pattern of attempting to access digital credentials. For example, a document application, such as ADOBE ACROBAT READER, may not require credentials in order to display documents and may not typically access credential data. As another example, a historical behavior pattern of an application, such as historical behavior 124 on server 206, may include patterns of behavior from the application installed on computing device 202 and/or multiple computing devices. A classification algorithm, such as a machine learning algorithm, may then classify historical behavior 124 collected from computing device 202 and/or multiple computing devices to determine whether an attempt to access a digital credential is anomalous for the specific application. Alternatively, maintenance module 104 may determine that applications in set of application 208 has no historical record of accessing credential data.

Figure 4:
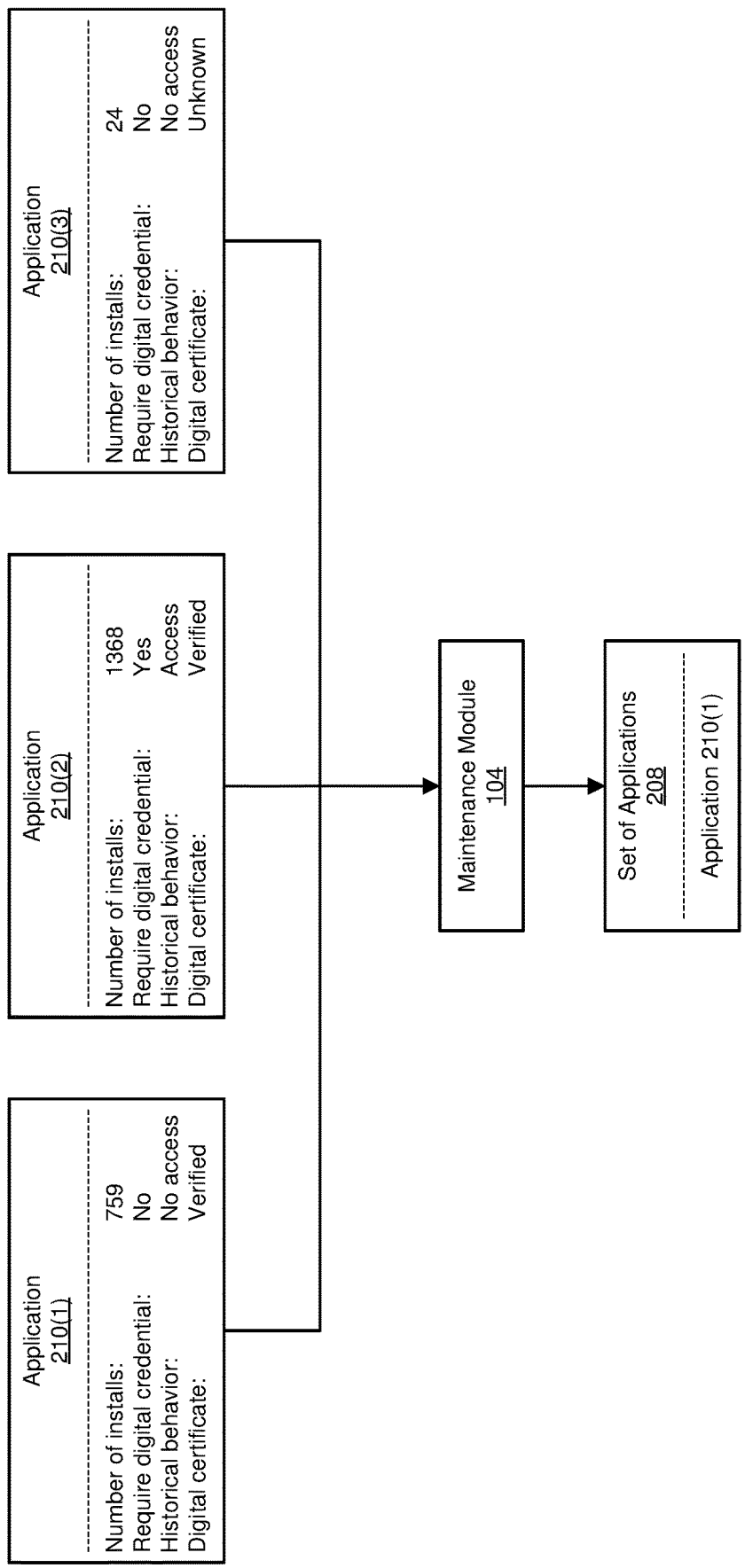
FIG. 4 is a block diagram of an example determination of an example set of applications for which attempting to access digital credentials comprises anomalous behavior.

For example, as shown in FIG. 4, information about an application 210(1), an application 210(2), and an application 210(3) installed on computing device 202 in FIG. 2 may be used by maintenance module 104 to determine set of applications 208 for which attempting to access digital credentials comprises anomalous behavior. In this example, application 210(2) may require digital credentials and have a history of accessing credentials. Application 210(3) may be installed on a low number of devices, not meeting the minimum requirement of installs, and have an unknown digital certificate. In this example, maintenance module 104 may only include application 210(1) in set of applications 208, based on the above criteria.

In some embodiments, maintenance module 104 may also modify set of applications 208 based on modifications to an application. In the example of FIG. 4, application 210(2) may be modified to not require digital credentials to function and may be added to set of applications 208. Similarly, application 210(3) may be installed on more computing devices to meet the minimum number and may obtain a verified digital certificate. In this example, maintenance module 104 may also add application 210(3) to set of applications 208. Alternatively, application 210(1) may change to require access to a digital credential, and maintenance module 104 may remove application 210(1) from set of applications 208.

Although illustrated as part of computing device 202 in FIG. 2, all or part of maintenance module 104 may be executed by server 206. For example, server 206 may consolidate information and historical behavior for applications used by multiple computing devices, including computing device 202. Server 206 may also maintain a list of applications that fulfill the above criteria for determining that an application is installed on a minimum number of computing devices, determining that attempting to access digital credentials comprises anomalous behavior for the application, and verifying a digital certificate of the application. Computing device 202 may then query the list maintained by server 206, for each application installed on computing device 202, to determine set of applications 208. Alternatively, in some examples, set of applications 208 may be interchangeable with the list of applications maintained by server 206.

Returning to FIG. 3, at step 304, one or more of the systems described herein may monitor, by the computing device, each application within the set of applications for attempts to access digital credentials. For example, monitoring module 106 may, as part of computing device 202 in FIG. 2, monitor each application within set of applications 208 for attempts to access digital credentials.

Monitoring module 106 may monitor each application within set of applications 208 in a variety of ways. In some embodiments, monitoring module 106 may monitor all behavior of each application within set of applications 208. Alternatively, monitoring module 106 may only monitor behaviors of applications within set of applications 208 that attempt to access a database that stores digital credentials, a credential program, and/or a registry path leading to credential data. In other embodiments, monitoring module 106 may monitor all attempts to access digital credentials on computing device 202 and isolate relevant attempts by applications within set of applications 208.

As used herein, the term "credential program" generally refers to a program or process that enforces or provides security for digital credentials. For example, a credential program may include a web browser with a built-in password manager that may save user passwords. Other examples of credential programs include, without limitation, authentication programs, password managers, security policy enforcement programs, operating system processes such as LOCAL SECURITY AUTHORITY SUBSYSTEM SERVICE (LSASS), variations or combinations of one or more of the same, and/or any other suitable credential program. The term "registry path," as used herein, generally refers to a path or filename leading to the location of specific data, such as a directory within a hierarchical database structure.

Returning to FIG. 3, at step 306, one or more of the systems described herein may automatically detect, while monitoring for attempts to access digital credentials, an attempt of an application in the set of applications to access a digital credential. For example, detection module 108 may, as part of computing device 202 in FIG. 2, automatically detect, while monitoring for attempts to access digital credentials, attempt 212 of application 210 in set of applications 208 to access a digital credential.

Detection module 108 may detect attempt 212 in a variety of ways. In some examples, attempt 212 to access the digital credential may include an attempt to read from a digital memory of a credential program and/or an attempt to access a registry path leading to credential data. In these examples, attempt 212 may attempt to access digital credential 122 in FIG. 1, which may be stored on computing device 202. In these examples, detection module 108 may detect attempt 212 by intercepting all attempts to access credential data and/or detecting a command by application 210 to access credential data.

Figure 5:
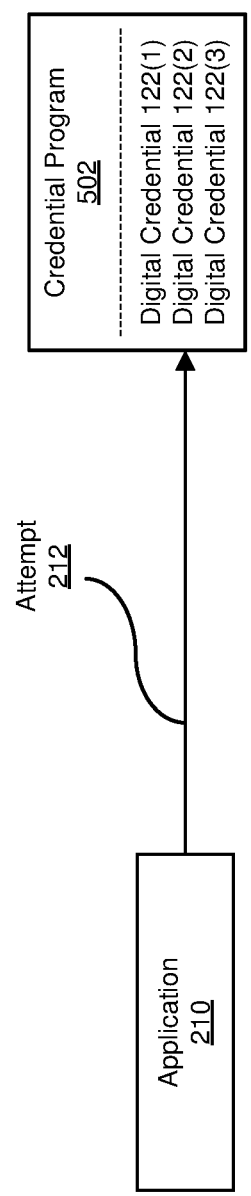
FIG. 5 is a block diagram of an example attempt to access an example digital credential.

For example, as shown in FIG. 5, a credential program 502 may contain digital credentials 122(1), 122(2), and 122(3). Application 210 may attempt to access digital credential 122(2) in credential program 502, such as by attempting to read from the memory of LSASS. Detection module 108 may then intercept attempt 212 to access digital credential 122(2) during the monitoring of application 210.

Returning to FIG. 3, at step 308, one or more of the systems described herein may perform, in response to detecting the attempt to access the digital credential, a security action to secure the digital credential. For example, performance module 110 may, as part of computing device 202 in FIG. 2, perform, in response to detecting attempt 212 to access the digital credential, security action 214 to secure the digital credential.

Performance module 110 may perform security action 214 in a variety of ways. In one embodiment, performance module 110 may perform security action 214 by triggering an alert on computing device 202, notifying administrator 216 about attempt 212 to access the digital credential, and/or blocking attempt 212. In this embodiment, administrator 216 may be an incident responder, such as a member of a Computer Security Incident Response Team (CSIRT), who may further investigate attempt 212 and/or application 210 for security risks to computing device 202.

Additionally or alternatively, performance module 110 may perform security action 214 by sending an application update suggestion to a user of the computing device and/or automatically updating application 210 to patch a vulnerability. In the example of FIG. 2, anomalous attempt 212 by application 210 to access digital credential 122 in FIG. 1 may indicate a vulnerability in application 210. Performance module 110 may then send the application update suggestion to administrator 216 to patch the vulnerability of application 210 to prevent unauthorized access to digital credential 122.

In some examples, the systems described herein may further include modifying a record of historical behavior for application 210 based on attempt 212 to access the digital credential. In the example of FIG. 2, performance module 110 may modify historical behavior 124 on server 206 to include attempt 212 to access digital credential 122 of FIG. 1. In this example, modified historical behavior 124 may then be used for subsequent analyses in determining whether access to credential data is anomalous for application 210. In other words, maintenance module 104 may revise set of applications 208 based on modified historical behavior 124, and subsequent attempts by application 210 to access credential data may not be considered anomalous.

As explained above in connection with method 300 in FIG. 3, the disclosed systems and methods may, by monitoring applications that may be at risk of compromise, prevent unauthorized access to digital credentials. Specifically, the applications to monitor may be determined by the three following criteria: (i) applications that are widely used, (ii) applications for which access to credential data is anomalous or not required, and (iii) applications that have a verified digital certificate. By applying these three criteria to data from multiple computing devices, the systems and methods described herein may distinguish between legitimate access of credential data and potentially malicious theft of credentials.

After selecting the set of applications to monitor, the disclosed systems and methods may then detect an anomalous attempt to access a digital credential by an application within the monitored set of applications. Anomalous behavior to access credentials or a registry path leading to credential data may indicate credential theft, and the systems and methods described herein may alert an incident responder about the potential threat. Other actions to protect credentials may include preventing access to the credential data and/or updating the application to repair potential vulnerabilities.

As detailed above, by following strict criteria applied to applications installed on multiple client computing devices, the disclosed systems and methods may reduce false positives in detecting credential theft on a single device. In addition, by increasing security to prevent unauthorized access of credential data, the disclosed systems and methods may protect computing devices from escalated security breaches. Thus, the systems and methods described herein may improve threat detection and prevention against credential theft.

Figure 6:
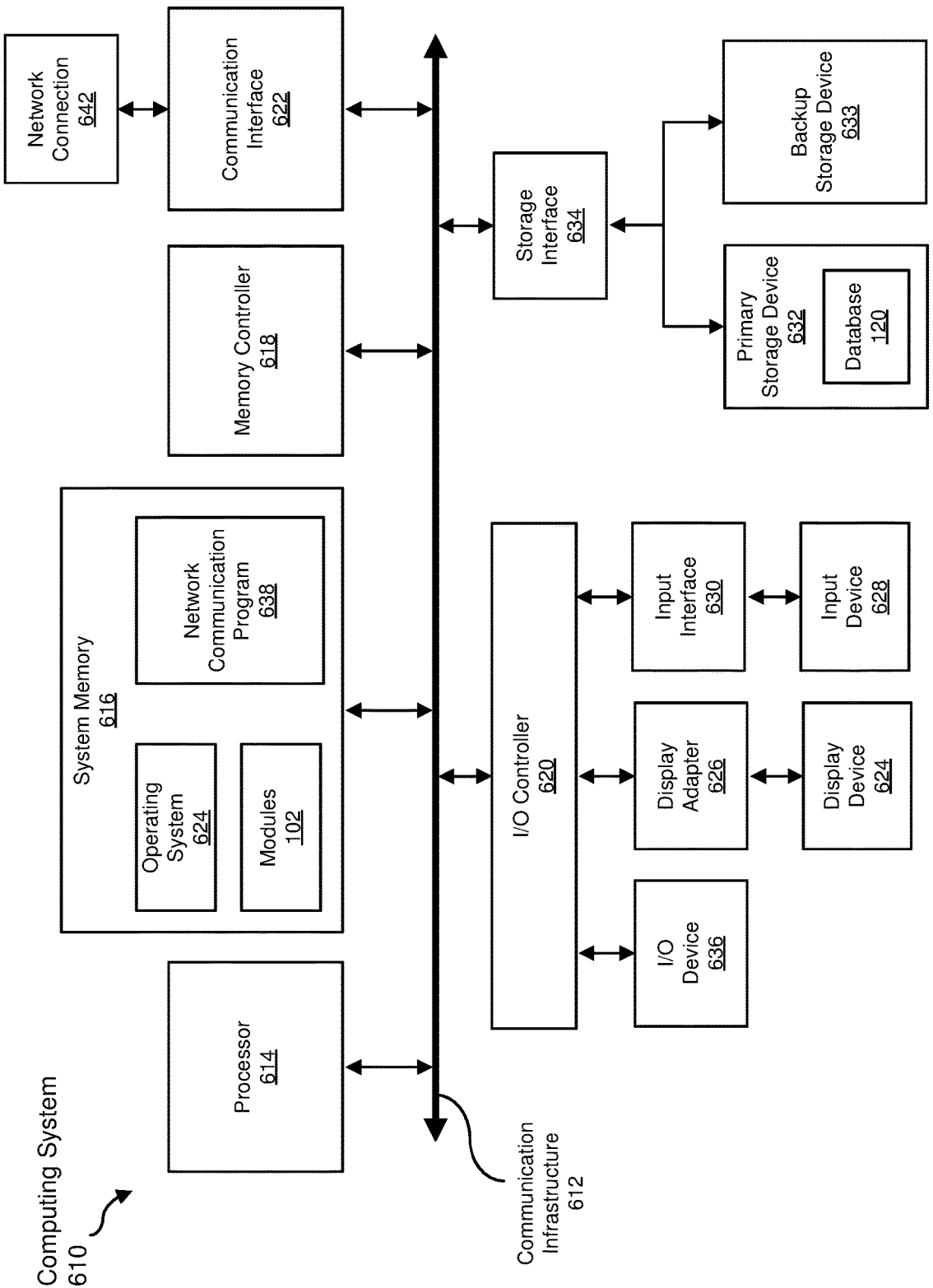
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor

614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application-Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an ASIC adapted to implement one or more of the example embodiments disclosed herein.

Figure 7:
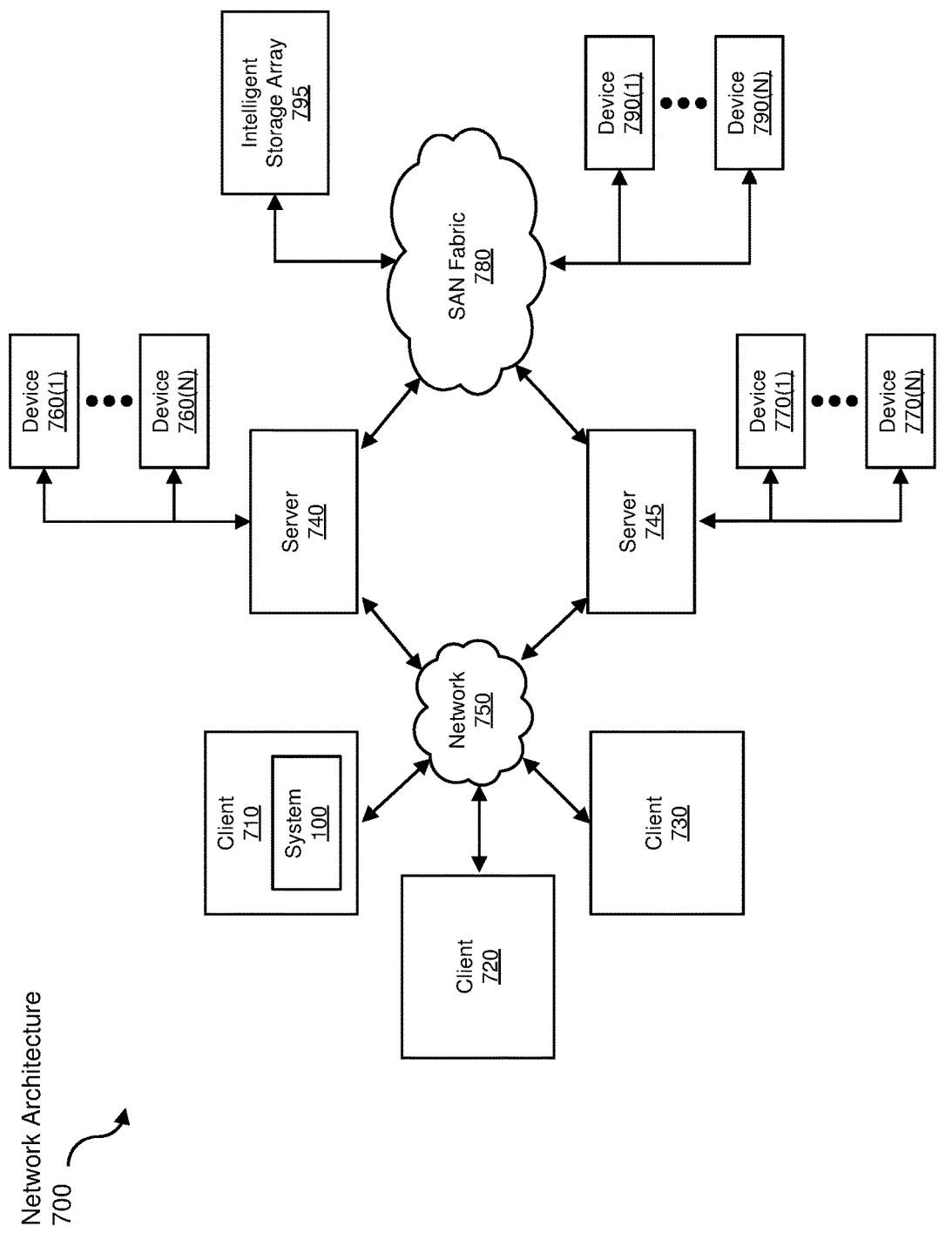
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for controlling access to credentials.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a record of historical behavior of an application to be transformed, transform the record of historical behavior, output a result of the transformation to a storage or output device, use the result of the transformation to determine that accessing credential data comprises anomalous behavior for the application, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling access to credentials, at least a portion of the method being performed by a computing device comprising at least one processor, the method comprising:
    maintaining, by the computing device, a set of legitimate applications with verified digital certificates that are determined to be widely used based on being installed on a required minimum number of other computing devices, wherein:
        each legitimate application in the set of legitimate applications is selected based on determining that attempting to access digital credentials comprises anomalous behavior for the legitimate application by determining that the legitimate application does not display a historical behavior pattern of attempting to access digital credentials; and
    applications that do not meet a required minimum number of installations on the other computing devices are excluded from the set of legitimate applications;
    monitoring, by the computing device, each legitimate application within the set of legitimate applications for attempts to access digital credentials;
    automatically detecting, while monitoring behaviors of each legitimate application in the set of legitimate applications, an attempt of a potentially compromised legitimate application in the set of legitimate applications to access a digital credential; and
    performing, in response to detecting the attempt to access the digital credential, a security action to secure the digital credential against unauthorized access by the potentially compromised legitimate application by blocking the attempt to access the digital credential, wherein performing the security action comprises at least one of:
    sending an application update suggestion to a user of the computing device; or
    automatically updating the potentially compromised legitimate application to patch a vulnerability.

2. The method of claim 1, wherein maintaining the set of legitimate applications comprises, for each application installed on the computing device:
    determining that the application is installed on the required minimum number of other computing devices; and
    verifying a digital certificate of the application.

3. The method of claim 1, wherein determining that attempting to access digital credentials comprises anomalous behavior for the legitimate application comprises determining that the legitimate application does not require digital credentials to function.

4. The method of claim 1, wherein the attempt to access the digital credential comprises at least one of:
    an attempt to read from a digital memory of a credential program; and
    an attempt to access a registry path leading to credential data.

5. The method of claim 1, wherein performing the security action comprises at least one of:
    triggering an alert on the computing device; and
    notifying an administrator about the attempt to access the digital credential.

6. The method of claim 1, further comprising modifying a record of historical behavior for the potentially compromised legitimate application based on the attempt to access the digital credential.

7. A system for controlling access to credentials, the system comprising:
    a maintenance module, stored in memory, that maintains, by a computing device, a set of legitimate applications with verified digital certificates that are determined to be widely used based on being installed on a required minimum number of other computing devices, wherein:
        each legitimate application in the set of legitimate applications is selected based on determining that attempting to access digital credentials comprises anomalous behavior for the legitimate application by determining that the legitimate application does not display a historical behavior pattern of attempting to access digital credentials; and applications that do not meet a required minimum number of installations on the other computing devices are excluded from the set of legitimate applications;

a monitoring module, stored in memory, that monitors, by the computing device, each legitimate application within the set of legitimate applications for attempts to access digital credentials;

a detection module, stored in memory, that automatically detects, while monitoring behaviors of each legitimate application in the set of legitimate applications, an attempt of a potentially compromised legitimate application in the set of legitimate applications to access a digital credential;

a performance module, stored in memory, that performs, in response to detecting the attempt to access the digital credential, a security action to secure the digital credential against unauthorized access by the potentially compromised legitimate application by blocking the attempt to access the digital credential, wherein performing the security action comprises at least one of:

sending an application update suggestion to a user of the computing device; and automatically updating the potentially compromised legitimate application to patch a vulnerability; and at least one processor that executes the maintenance module, the monitoring module, the detection module, and the performance module.

8. The system of claim 7, wherein the maintenance module maintains the set of legitimate applications by, for each application installed on the computing device:

determining that the application is installed on the required minimum number of other computing devices; and verifying a digital certificate of the application.

9. The system of claim 7, wherein determining that attempting to access digital credentials comprises anomalous behavior for the legitimate application comprises determining that the legitimate application does not require digital credentials to function.

10. The system of claim 7, wherein the attempt to access the digital credential comprises at least one of:

an attempt to read from a digital memory of a credential program; and an attempt to access a registry path leading to credential data.

11. The system of claim 7, wherein the performance module performs the security action by at least one of:

triggering an alert on the computing device; and notifying an administrator about the attempt to access the digital credential.

12. The system of claim 7, further comprising modifying a record of historical behavior for the potentially compromised legitimate application based on the attempt to access the digital credential.

13. A non-transitory computer-readable medium comprising one or more computer-executable instructions that, when executed by at least one processor of a computing device, cause the computing device to:

maintain, by the computing device, a set of legitimate applications with verified digital certificates that are determined to be widely used based on being installed on a required minimum number of other computing devices, wherein:

each legitimate application in the set of legitimate applications is selected based on determining that attempting to access digital credentials comprises anomalous behavior for the legitimate application by determining that the legitimate application does not display a historical behavior pattern of attempting to access digital credentials; and applications that do not meet a required minimum number of installations on the other computing devices are excluded from the set of legitimate applications;

monitor, by the computing device, each legitimate application within the set of legitimate applications for attempts to access digital credentials;

automatically detect, while monitoring behaviors of each legitimate application in the set of legitimate applications, an attempt of a potentially compromised legitimate application in the set of legitimate applications to access a digital credential; and perform, in response to detecting the attempt to access the digital credential, a security action to secure the digital credential against unauthorized access by the potentially compromised legitimate application by blocking the attempt to access the digital credential, wherein performing the security action comprises at least one of:

sending an application update suggestion to a user of the computing device; and automatically updating the potentially compromised legitimate application to patch a vulnerability.

14. The non-transitory computer-readable medium of claim 13, wherein the computer-executable instructions cause the computing device to maintain the set of legitimate applications by, for each application installed on the computing device:

determining that the application is installed on the required minimum number of other computing devices; and verifying a digital certificate of the application.

15. The non-transitory computer-readable medium of claim 13, wherein determining that attempting to access digital credentials comprises anomalous behavior for the legitimate application comprises determining that the application does not require digital credentials to function.

16. The non-transitory computer-readable medium of claim 13, wherein the attempt to access the digital credential comprises at least one of:

an attempt to read from a digital memory of a credential program; and an attempt to access a registry path leading to credential data.

17. The non-transitory computer-readable medium of claim 13, wherein the computer-executable instructions cause the computing device to perform the security action by at least one of:

triggering an alert on the computing device; and notifying an administrator about the attempt to access the digital credential.

* * * * *